March 27, 1962 N. G. SCHREWELIUS 3,027,331
ELECTRIC RESISTANCE HEATING ELEMENTS AND THEIR MANUFACTURE
Filed Nov. 25, 1960 5 Sheets-Sheet 1

March 27, 1962   N. G. SCHREWELIUS   3,027,331
ELECTRIC RESISTANCE HEATING ELEMENTS AND THEIR MANUFACTURE
Filed Nov. 25, 1960   5 Sheets-Sheet 3

March 27, 1962  N. G. SCHREWELIUS  3,027,331
ELECTRIC RESISTANCE HEATING ELEMENTS AND THEIR MANUFACTURE
Filed Nov. 25, 1960  5 Sheets-Sheet 4

United States Patent Office 3,027,331
Patented Mar. 27, 1962

3,027,331
ELECTRIC RESISTANCE HEATING ELEMENTS
AND THEIR MANUFACTURE
Nils Gustav Schrewelius, Asvagen, Sweden, assignor to Aktiebolaget Kanthal, Hallstahammar, Sweden, a corporation of Sweden
Filed Nov. 25, 1960, Ser. No. 71,728
17 Claims. (Cl. 252—518)

This invention relates particularly to electric resistance heating elements composed mainly of molybdenum disilicide and to their manufacture. However, the principles of this invention may be used otherwise.

This application is a continuation-in-part of my co-pending application Serial No. 799,234, filed on March 13, 1959 now abandoned.

An object is to provide elements capable of continuous service under oxidizing conditions at temperatures higher than have heretofore been possible. Another object is to achive the preceding object in a commercially practicable manner. Other objects may be inferred from the following.

One example of the invention is embodied by a current commercialized manufacturing practice producing electric resistance heating elements having looped heating parts with their ends butt-welded to terminal parts for connection with suitable electric power connecting clamps. This example is described below with the aid of the accompanying partially schematic drawings in which.

In the following all references to proportions are by weight and all temperatures are in degrees centigrade unless otherwise indicated.

Molybdenum powder of the 325 mesh screen size and which is 99.8% pure is thoroughly intermixed with crystalline silicon of the grade passing a 100 mesh screen, containing less than 0.50% iron and 99% pure. These are commercially available powdered metals. More finely divided and purer metal powders would be used if obtainable. The proportions of the resulting mixture are 63% molybdenum and 37% silicon.

Figure 1:
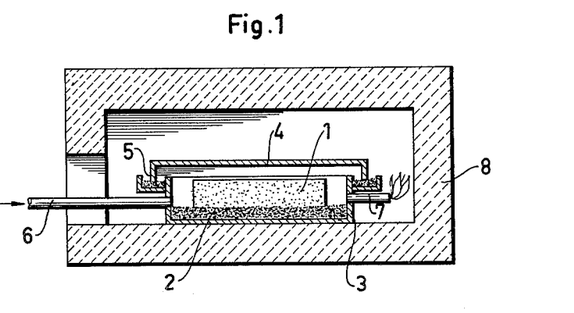
FIG. 1 shows in vertical longitudinal section equipment used to react molybdenum and silicon to form molybdenum disilicide.

These intermixed powdered metals clink together enough to hold a shape without flowing because of gravity. They are moulded into a cake 1 and placed on a granular molybdenum disilicide bed 2 in a pan 3 having a lid 4 rendered gas tight by a sand seal 5. The pan has a gas inlet 6 through which hydrogen is passed and an outlet 7 for this gas and where the latter is burnt to dispose of it safely. While thus flooded with hydrogen the pan is placed in a furnace 8, the furnace temperature being about 1250°, and with adequate time the mixture heats to a temperature causing the reaction to start, it then proceeding to completion rapidly. The pan and lid are made of heat resistant metal alloy and the size of the cake is limited only by the ability of this alloy to resist the heat generated by the reaction.

After the reaction is completed the pan is removed from the furnace and while continuously flushed with the hydrogen with its lid still in place the molybdenum disilicide it now contains is permitted to cool to about a 200° maximum. At anytime thereafter it is removed from the pan and ultimately it cools to room temperature. This molybdenum disilicide is in the form of a spongy cake which can be crushed or broken into small particles.

This molybdenum disilicide cake is crushed by any suitable means, not illustrated, to about a 1 millimeter particle size which is adequately massive to prevent appreciable surface oxidation because of exposure to air at room temperature.

Figure 2:
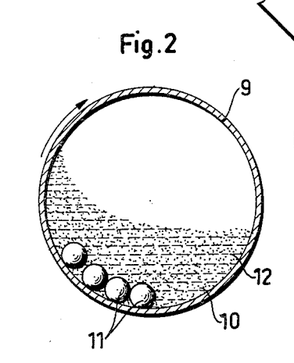
FIG. 2 illustrates in vertical cross section a ball mill used for milling the disilicide to a fine powder.

A quantity of such above particles are placed in a ball mill of which the fully enclosed rotating drum 9 made of hardened steel is illustrated, this quantity depending on the size of this drum. The molybdenum disilicide particles are shown at 10 in this drum 9 and also the cobalt cemented tungsten carbide balls or rolls 11 and an appropriate quantity of a protecting liquid, preferably pure gasoline 12 which keeps the molybdenum disilicide particles wet at all times and prevents their oxidation as far as possible. The conditions illustrated are necessarily schematic. This ball milling under the gasoline protection is continued for about 120 hours and in any event long enough to reduce or pulverize the molybdenum disilicide particles to an extremely fine powder having a particle size of from 3 to 8 microns. The described milling results in this particle size range although as a practical matter a few somewhat larger particles may result. Every effort is made to keep the particle size below 10 microns. The particles include from about .40% to about 1% of iron, presumably from the drum 9, the amount varying but being appreciable. Some of the iron may come from the raw materials.

Figure 3:
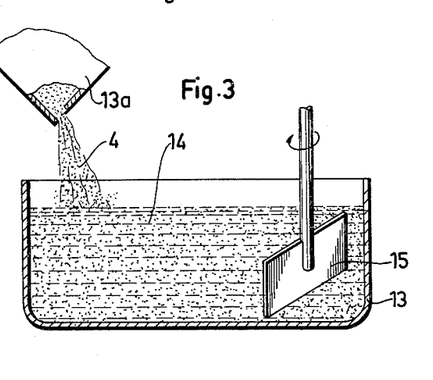
FIG. 3 in vertical section illustrates a mixer used to mix the disilicide powder with a bentonite and water slurry.

This disilicide powder mixed with the protecting gasoline in the form of a slurry is poured from the drum 9 through a screen (not shown) to remove the balls or rolls 11, directly into a water heated vacuum drier 13 having an air-tight cover (not shown) to remove the gasoline by evaporation. Thus the disilicide powder is completely dried while protected against oxidation because it is under a vacuum.

It should be noted that in practice it may be impossible to make the protection against oxidation perfect but the condition should anyhow be such as to minimize any oxidation as far as possible. Whenever in the following specification expressions like "protected against oxidation" and "under non-oxidizing conditions" and "in a non-oxidizing atmosphere" et cetera are used, such expressions should thus be interpreted under the above reservation. As an example in respect of "non-oxidizing atmospheres," these may contain at most 0.5 percent by volume of water vapour.

This molybdenum disilicide powder of from 3 to 8 microns particle size is a pyrophoric material subject to spontaneous combustion even at room temperatures if exposed to oxidizing conditions. Therefore, it must be protected as far as possible against oxidation at all time.

When the molybdenum disilicide powder is completely dry and at room temperature and preferably as cold as possible the vacuum drier 13 is filled with argon above the dried powder, then the necessary cover (not shown) is removed from the vacuum drying enclosure, and a cold bentonite and water slurry 14 is poured from a container 13a through the argon and on the dried powder. As soon as all of the slurry is poured the resulting mixture is placed under constant and vigorous agitation by an agitator 15 of the type which rotates rapidly about its vertical axis while its own axis rotates about an offset vertical axis. This agitator is lowered into the mixture. The aim is to get the molybdenum disilicide powder particles each thoroughly wetted and completely coated by the bentonite slurry as rapidly as possible under conditions avoiding as far as possible oxidation of the powder.

To form the bentonite slurry which is poured on the finely powdered molybdenum disilicide, commercially available pulverized "Wyoming" bentonite is dried thoroughly by maintaining it at 100° for one day under conditions permitting the evaporation of all water that can be removed in this manner. This drying permits the bentonite to be screened through a 200 mesh screen to remove coarse sand or other foreign matter and then the bentonite is mixed with the slurry water and sieved through a 325 mesh sieve to remove the finer sand and foreign matter.

The weight of the dried molybdenum disilicide powder in the vacuum drier is a weighed amount and this dried pulverized bentonite is proportioned so that if mixed with the dried disilicide powder the proportions by dry weight of the resulting mixture would be about 5% bentonite and 95% molybdenum disilicide. Such an amount of the powdered bentonite, processed as described, is mixed with water in the proportions of 15% of the bentonite to 85% water, thorough mixing providing the slurry which is poured on the molybdenum disilicide powder.

With adequately thorough mixing the molybdenum disilicide particles are quickly coated individually with the bentonite slurry. A wetting agent may be added to the slurry to promote even more rapid wetting of the disilicide particles than is provided by the inherent characteristics of the bentonite. The bentonite particles in the slurry are even smaller than the disilicide particles of 3 to 8 micron size. The relatively large amount of water used with the bentonite promotes complete and rapid mixing of the bentonite and disilicide particles.

The disilicide particles are now adequately coated with the slurry forming a film thereon protecting them against oxidation. The mixture is transferred to a water heated mixer (not shown) which is more powerful than the mixer 15. Any mixer which is powerful enough may be used. This mixing is very extended in time and during it water evaporates freely so that the water content of the slurry is reduced to form a plastic consistency. Thus, the thorough mixing is continued for about 48 hours while the water content reduces from the initial large amount to about 8% of the disilicide and bentonite mixture.

The use the very fluid slurry, of low viscosity, greatly promotes the desired application of a uniform layer of bentonite coating on each disilicide particle. Then the water evaporates during mixing to obtain the desired degree of plasticity.

Figure 4:
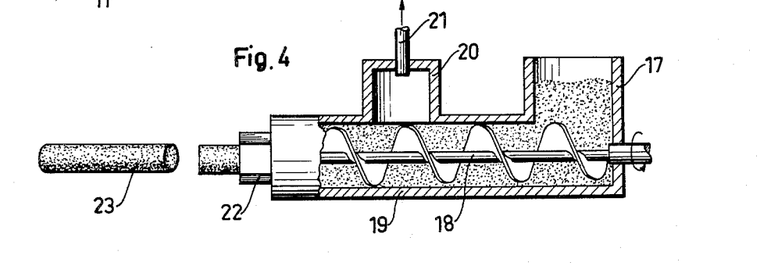
FIG. 4 is a vertical longitudinally sectioned view showing a deaerating extrusion machine producing plastic billets from the disilicide powder and bentonite mixture.

This plastic material is fed to the receiving hopper 17 of a de-airing extrusion machine of a commercially available type schematically illustrated by FIG. 4. The hopper feeds to a screw 18 which both kneads and feeds the material through a cooled casing 19 having an upwardly extending portion 20 provided with an outlet 21 to which suction is applied to evacuate the space within the portion 20 above the material as it is kneaded and fed by the screw, thus removing air from the mixture.

The screw 18 forces this plastic mixture through an extrusion die 22 forming the mixture into a round rod shape having a 50 millimeter diameter and from which billets 23 are severed. This diameter is used because it fits the extrusion machine described below. The billet length depends on the extrusion diameter and length desired and on the length the extrusion machine can accommodate.

The billets may be aged or stored if desired providing care is used to prevent excessive water loss. The billets should not be permitted to harden.

Figures 5, 6:
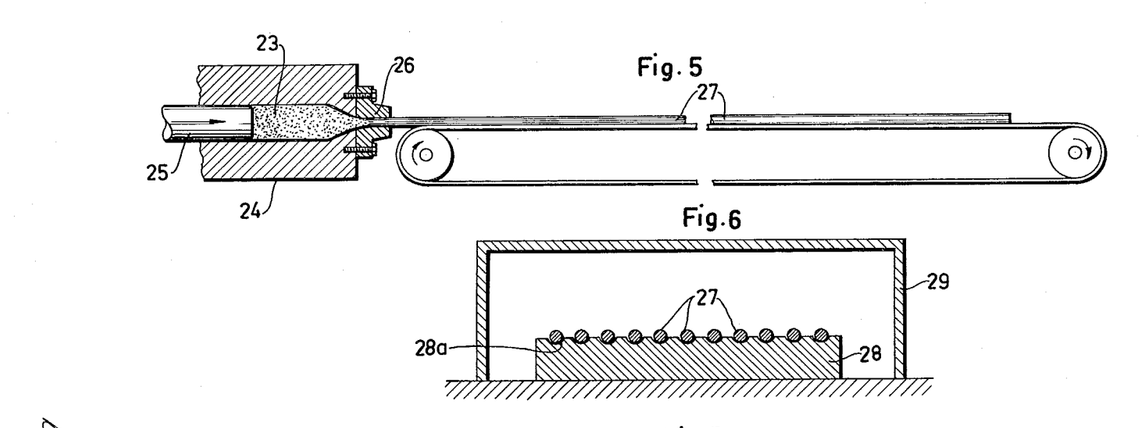
FIG. 5 in vertical longitudinal section shows an extrusion machine extruding the billets into rods which, excepting for differing diameters, are used to form both the heating parts and the terminal parts of the final elements.
FIG. 6 in vertical cross section shows a drying oven used for drying the extruded rods.

As shown by FIG. 5, these plastic billets 23 are charged successively into the extrusion cylinder 24 of an extrusion machine having an extrusion ram 25 which squirts the plastic through an extrusion die 26. Good plastic extrusion practices thus produce rod extrusions of uniform circular cross section lengthwise. The extrusions are soft and must be handled gently so each is extruded onto a travelling run-out belt 27 travelling at the extrusion speed of the machine and thus avoiding distortion of the extrusions. Each extruded rod is gently rolled laterally from this belt successively into a drying tray 28 having a plurality of smooth supporting rod grooves 28a which are thus loaded individually with the rods.

In this specific example the ultimate elements finally produced have electric resistance heating parts which are 6 millimeters in diameter and terminal parts which are 12-millimeters in diameter. Therefore, when the rod 27 is for the heating parts it is extruded with a diameter of 7 millimeters and when it is to be used for the terminal parts a die is used providing an extruded rod having a diameter of 14 millimeters. This enlarged diameter compensates for shrinkage that occurs during the subsequent processing.

The extruded rods in the tray 28 are placed in a drying oven 29 at about room temperature and an initial humidity of about 100%. The rods in their tray remain in the oven for about 80 to 100 hours during which time the temperature at a roughly linear rate is increased so that it reaches about 35° at the end of the time, the oven humidity then being about 50%. This relieves the extrusions from internal stress induced by the extruding. With drying the rods stiffen and become hard. The dried bentonite both bonds the disilicide powder particles together and continues to prtoect them as far as possible against oxidation. Also, it provides a green strength adequate for commercial production handling.

Figure 7:
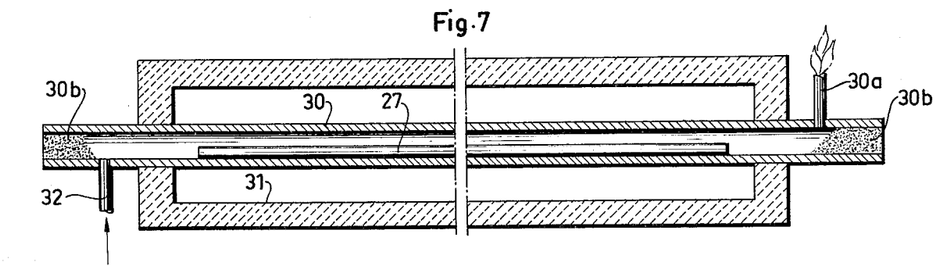
FIG. 7 in vertical longitudinal section shows a tubular furnace used for sintering the dried rods in a non-oxidizing atmosphere.

After the rods 27 are dried as much as is possible under the above conditions the grooves 28a at one end of the tray 28 are successively registered with one end of each tube 30 of a tubular furnace having a plurality of such tubes surrounded by a heating chamber 31. Then in each instance the rod 27 is pushed endwise from its groove 28a into the tube 30 where it is shown in FIG. 7.

When the rods 27 are first pushed into the tubes 30 the heating chamber 31, and the tubes, are cold. Each tube 30 is provided with a gas inlet 32 and an outlet 30a and dry pure hydrogen is passed through the inlet 32 so as to keep each tube 30 flooded with hydrogen, the hydrogen being burned for safe disposal as it leaves the outlet 30a. In any case a granular refractory 30b is used to close the ends of the tubes 30.

With the tubes 30 continuously flooded with the hydrogen the heating is started and the practice has been to continue at a linear rate until a temperature of 1050° was reached, the rate of heating being such that this required about 12 hours to go from room temperature to this higher temperature.

This slow rate of heating is for the purpose of slowly removing any remaining mechanically entrapped water and freeing all of the so-called chemically bound water. Rapid removal may result in the escaping water vapor forcing fissures to appear in the rods and this is a harmful effect. Escape by slow diffusion through the material avoids this trouble.

As the temperature of the rods 27 slowly rises a temperature is reached when the disilicide particles begin to sinter together as indicated by the material starting to become electrically conductive. With this as a guide it appears that the disilicide particles intermixed with the bentonite begin to sinter at about 800° C. When the 1050° temperature is reached sintering proceeds more rapidly as indicated by the electrical conductivity of the material. The practice has been to hold for about 3 hours at this temperature. Longer holding times at this temperature apparently produce relatively little further increase in the electrical conductivity.

The 1050° temperature described has been used because of the heat resistant limitations of the tubes 30. With tubes of increased heat resistance the described slow heating is now continued up further to from 1250° to 1300°. Temperatures higher than about 1450° are avoided because in the dry hydrogen atmosphere the silicon vaporizes and is lost and the rods begin to rapidly lose a plasticity they have for a few hours at such higher temperatures and which is required for them to be shaped into loops and the like in the manner described hereinafter.

The purpose of this sintering in the hydrogen atmosphere is to sinter the rods 27 under practically non-oxidizing conditions to a very dense state of adequately low porosity to permit them to be heated subsequently in air or under other oxidizing conditions without this resulting in harmful interior effects. With the low porosity of about 15% by volume resulting from the described sintering of the disilicide and bentonite mixture the rods may be heated to temperatures up to 1800° under oxidizing conditions rapidly with a consequent rapid formation of the characteristic protective glaze or glass layer on the surfaces of the rods and sealing outwardly opening surface pore depressions. With this low porosity the surface pores are thus sealed rapidly enough with the protective vitreous material to prevent penetrating harmful effects.

During this sintering the electrical conductivity of the material is used as a guide to establish the holding time at the holding temperature used. There is a relatively rapid initial rise in the electrical conductivity which then levels off so that with more prolonged heating there is, practically speaking, no further increase in conductivity. This makes it possible to fix the holding time for the holding temperature used, since it may be terminated at the point where the conductivity of the material no longer increases enough to warrant further heating with its attendant cost.

After this sintering the initially 7 millimeter diameter rods have reduced to almost 6 millimeters in diameter and the 14 millimeter rods have reduced to a diameter of almost 12 millimeters. When this sintering is completed the material is hard and of the indicated very low porosity and the rods may be removed from the protection of the hydrogen flooded tubes 30. Cooling rates are unimportant at this time.

When the terminal rods are sintered as described their thicker diameter makes it possible that for holding times of reasonably short duration their porosity is not decreased adequately. Therefore, after the described sintering they are cooled to room temperature in the hydrogen so they can be handled. They are thereafter pushed through an unillustrated tubular furnace having both heating and cooling zones flushed with hydrogen. The tubes are ceramic and are maintained at temperatures of from 1300 to 1350°, the travelling speeds of the rods endwise is about 5 centimeters per minute and the heating zone is about 70 centimeters long. Thus the material is not heated to these high temperatures very long and so does not have much opportunity to lose its previously-mentioned plasticity. The cooling zone is only long enough to cool the material rapidly for convenience. Continuous heating of this type has the advantage of providing a more uniform heating and when suitable equipment is available may be used for all of the sintering of all of the material. This more uniform heating is effected throughout the length of the rods. This extra sintering step may also be used for further sintering the smaller diameter rods used for the heating parts. It effects a greater densification and correspondingly less porosity and it makes certain of a heating uniformly applied throughout the lengths of the rods.

The rods are produced in long lengths for production reasons and they are cut to shorter lengths. The sintered rods intended for the heating parts are cut to the lengths desired for these parts and the sintered terminal part rods are cut to lengths representing a multiplicity of terminal lengths. This cutting is done by using rotating suitably hard abrasive disks.

Since the material has been sintered under practically non-oxidizing conditions or at least under highly minimized oxidizing conditions up to this stage these cut lengths of rod do not have their protective surface glaze or glass layer which forms only when oxygen is available to combine with the material's silicon. If the material is kept too long under oxidizing conditions at elevated temperatures below those causing the rapid formation of this protective layer, they may be ruined by deeply penetrating or interior oxidation effects. The terminal parts must of necessity have portions which are not heated to temperatures high enough to form the protective glaze or glassy layer.

Figure 8:
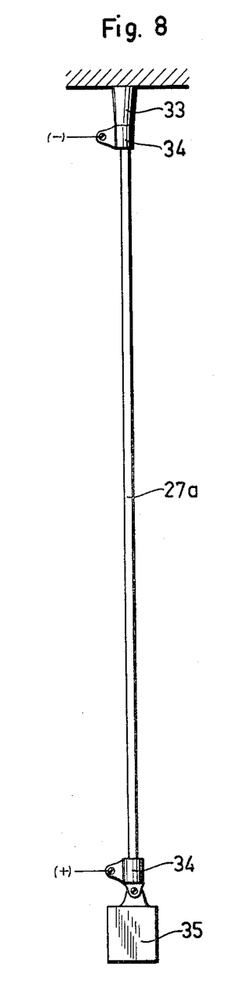
FIG. 8 illustrates in elevation a cut length of one of the sintered rods being heated under oxidizing conditions.

Therefore, each cut length 27a is positioned vertically with its upper end engaged by an electric power connecting clamp 34 mounted by a bracket 33 so as to support the rod. The lower end of this rod length is engaged by a corresponding clamp 34 to which a weight 35 is connected so as to tension the length 27a. Electric power is supplied to the two clamps so as to electric resistance heat the length 27a, this being done so that the temperature of the cut length is quickly increased from room temperature to 1550°. This entire temperature increase occurs in about 30 seconds and the length 27a is suspended in the air so that it is subjected to oxidation. The material is maintained at this high temperature for about 5 minutes after which the electric power is terminated abruptly so that the material cools rapidly back to room temperature.

During the above heating the protective glaze forms so rapidly that it seals the outwardly opening surface pores quickly enough to prevent harmful deeper oxidation effects. This glassy layer forms as a continuous sheath covering the rod's entire surface. At the described temperature the rod material becomes plastic and its straightness is assured by the weight 35 which tensions the rod. Because of the plasticity this tension must not be very great because otherwise it would stretch the rod appreciably. In this practice the tension is applied by a 2 kilogram weight. This temperature is higher than the sintering temperature used formerly and a further reduction in the porosity of the material is effected. At this time porosity may be substantially undetectable. This heating in open air results in a further slight shrinkage of the material as it further densifies. This brings the heating part length to its final 6 millimeter diameter and the terminal part length to its final 12 millimeter diameter.

As previously indicated the material at temperatures of 1100° upwardly is plastic. This plasticity at such elevated temperatures is a temporary condition which exists for from about 2 to possibly 10 hours. This time period does not appear to be affected by interruptions during which the material cools. Higher temperatures cause this plasticity period to shorten as compared to its duration at temperature closer to the 1100° temperature indicated. Possibly lower temperatures than this may with time cause this plastic time period to be exhausted. During the previous processing of the rod this characteristic of this material must be kept in mind.

Figure 9:
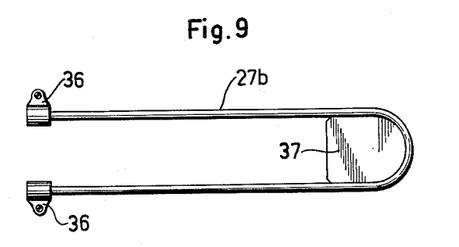
FIG. 9 is a top view showing such a cut length from the rods for the electric resistance heating parts being shaped into loops.
Figure 10:
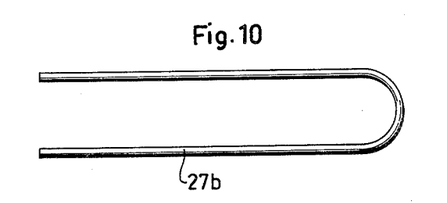
FIG. 10 shows the above part after being shaped and ready to receive its terminal parts.

This plastic characteristic permits the shaping of the electric resistance heating rod parts to be shaped as desired. This is done by applying electroc power connecting clamps 36 to the ends of the rod and by the use of electric power again heating the rod to 1550°. This may be done very rapidly. Plasticity at this time is such that the rod length 27a may be looped about a die 37 by manual force. The material is very substantially plastic prior to the expiration of the life of this characteristic. This looping is shown by FIG. 9 as resulting in a simple loop 27b but deeply zig-zagged multiple loops and other shapes are produced. After shaping the rod material may be permitted to cool at any rate.

The above shaping operation also involves very rapid heating which may be relied on to impart the protective glaze if the latter is not previously applied as described. In such an instance the greater desification of the material would also result.

Figure 11:
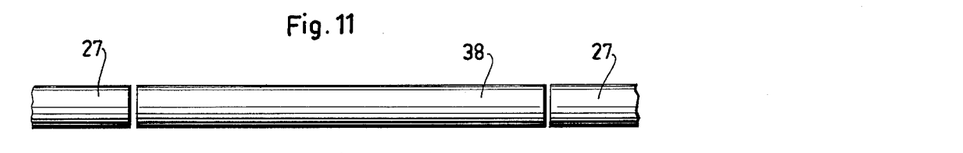
FIG. 11 shows in elevation a length of the rod of terminal diameter as it is cut to terminal length.

As previously noted such a heating part or loop 27b is provided with terminal parts. The latter are of the 12 millimeter larger diameter, relative to the 6 millimeter heating portion, to provide for cooler ends. FIG. 11 shows a terminal length 38 cut from the balance of one of the terminal part rods 27a processed as previously described including the glazing step but, of course, not the shaping by looping and the like.

Figure 12:
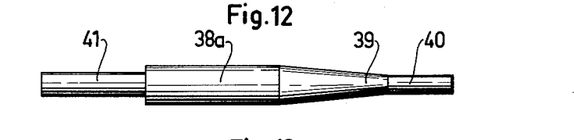
FIG. 12 is like FIG. 11 excepting that it shows the terminal length after machining to shape.

This length 38 is machined to provide a tapered portion 39 where the diameter of the shape 10 is reduced to merge with a straight cylindrical end section 40 having the 6 millimeter diameter of the ends of the heating element part 27b. At the other end of this terminal piece the material is machined to provide a reduced section 41 which is preferably cylindrical. These operations leave only the generally central portion 38a glazed, the machining operations leaving the other portions unglazed.

Figure 13:
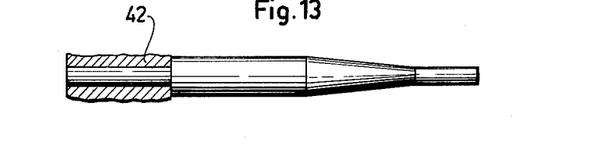
FIG. 13 is like FIG. 12 excepting that it shows partially in section a following step in making the terminal part.
Figures 14, 15:
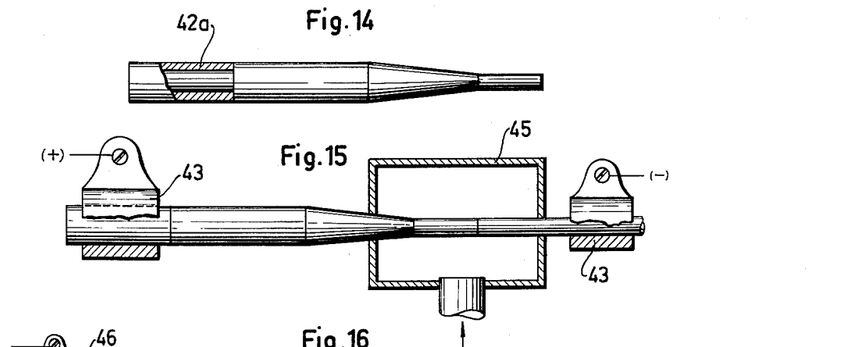
FIG. 14 is like FIG. 13 excepting that it shows the finally completed terminal.
FIG. 15 is a side view partially in vertical section showing the butt-welding of the terminal to one end of the loop shown by FIG. 5.

The surface of the reduced section 41 is roughened as by sand-blasting or its equivalent. Then an aluminum layer 42 is built on the section 41 by the flame spraying technique. That is to say, molten aluminum is sprayed on the section 41 and built up by continued spraying while the terminal part is rotated until the layer 42 has a diameter slightly larger than that of the central portion 38a. By flame spraying the aluminum into position it is possible to avoid any reaction between the aluminum and the molybdenum disilicide. The molten aluminum particles cool and solidify almost immediately upon contact with the section 41 and subsequently upon contact with the previously applied aluminum. The aluminum layer is machined to the diameter of the central or body portion 38a to provide a flush continuation of the latter in the form of a smooth aluminum surface 42a.

When producing the heating part and terminal part rods the glazing time is not so prolonged so as to use up the availably thermally plastic time period previously described. All of the material to be joined together should become plastic when heated.

Because of this temporary inherent elevated temperature plasticity possessed by this material it is possible to buttweld pieces together very much like pieces of steel are buttwelded together. Both the ends of the section 40 of the terminal part and the corresponding end of the heating part 27b should be machined at right angles to their axes so that when they are pressed together in mutual registration there is a substantially uniform pressure throughout the mating areas of the two parts.

As shown by FIG. 15 the electric butt-welding method is used, clamps 43 being applied to the two parts for electrical connection therewith and for mechanical engagement so that the two parts may be pushed linearly together. In the normal practice both parts are made with the same composition and since they both have the same diameters and have been processed practically in the same manner they both have very closely or exactly the same electrical resistivity and density and thermal plasticity. Sufficient electric current should be used to heat the parts to their thermaly plastic condition and sufficient butt-welding pressure should be used to produce a visible upset portion 44. The formation of the characteristic glaze between the surfaces being butt-welded is removed by the machining which squared the abutting end surfaces of the two parts and its formation at this time is avoided by the use of a shroud partially surrounding the welding zone and kept flooded with a non-oxidizing gas such as hydrogen or argon, the latter being used to avoid the inconvenience of burning hydrogen. This shroud 45 does not completely enclose the zone, because it is desirable to observe the progress of the butt-welding.

The described terminals are applied to both ends of the part 27b to form a complete element in each instance. Before leaving the plant this element may be heated while it is exposed to oxidizing conditions, to raise its temperature rapidly to the previously described glazing temperatures to glaze all parts of the element from which the previously applied glaze may have been removed by the described operations.

In producing the element having the heating parts of 6 millimeters diameter a pressure of about 15 kilograms is used to push the parts together during the butt-welding. The upsets 44 should be substantial and may amount to as much as a 50% enlargement of the diameter of the interwelded parts. However, it is possible to damage the material by using excessive pressure. The increased diameter causes the weld zones to operate at lower temperatures than the operating temperatures of the element in service.

Figure 16:
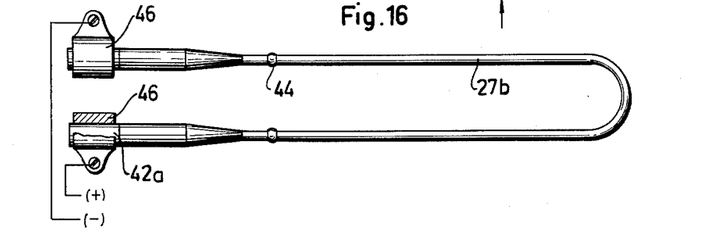
FIG. 16 is a side view showing the completed element operating as an electric resistance heater with the electric power connecting clamps shown in section.

In use conventional clamping connectors 46 may be applied to the aluminum surfaces 42a. The layer of aluminum 42 should be thick enough to permit high clamping pressures to deform the aluminum. This is to obtain extended area contacts between the terminals and the electrical connection clamps even though the clamps may not provide clamping surfaces exactly fitting the contours of the aluminum parts.

Although operating temperatures as high as 1800° C. under oxidizing conditions are practicable, the recommended operating temperature is given usually at 1600° C. to discourage the user from exceeding the safe maximum. The new elements do not exhibit excessive crystalline grain growth at temperatures not exceeding 1800° C.

At temperatures below about 1100° C. the new elements are brittle and very hard. However, experience has shown that the elements can be shipped safely and installed in the furnace by the user without undue difficulty. Above 1100° C. the new material from which these elements are made is somewhat ductile although once the thermal plasticity time limit terminates the elements become relatively rigid to bending regardless of their temperature.

The glaze or vitreous coating which provides the protection against oxidation softens at temperatures around 1550°. The elements may be suspended free from anything to which they might adhere upon cooling, their relative rigidity after the passage of the thermally plastic period permitting this type of installation.

The vitreous coating referred to above does not continue to grow harmfully when the elements are in service. When the material, initially free from the coating, is first heated rapidly under oxidizing conditions to a temperature causing oxygen to combine with the silicon of the disilicide rapidly, the coating forms rapidly. This coating is silica in the form of a glass presumably containing other substances since this glass has a softening temperature of around 1550°. It is not subject to further oxidation and once formed it seals the disilicide beneath it against further oxidation. During its formation the freed molybdenum can be observed leaving since it has the appearance of smoke because it is now molybdenum oxide.

Figure 17:
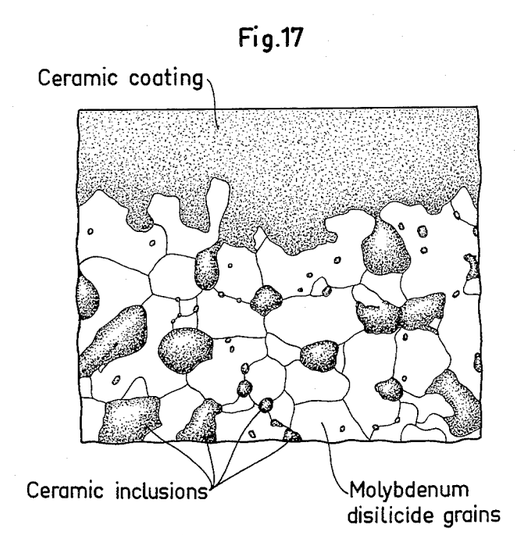
FIG. 17 shows the sintered material's microstructure.

The microstructure of the sintered material is represented by FIG. 17 as it appears at a magnification of about 2000 times. Legends identify the constituents. Note that the molybdenum disilicide forms a solid continuous matrix formed by fine grains having extensive intergrain or interparticle portions bonded directly together without any visible interposed constituent. The disilicide particles are truly sintered together. The ceramic inclusions are not only harmless but, to the contrary, strengthen the disilicide matrix. Porosity is substantially invisible although complete or absolute density may not be attained. Grain growth at elevated temperatures is never excessive and the elements apparently may be operated indefinitely under the recommended conditions without experiencing any operational difficulty due to this trouble.

The high temperature oxidizing step of FIG. 8 increases the density of the material. Objectionable grain growth seems to be blocked against developing, presumably by the ceramic inclusions. The ceramic after sintering is located mainly between what would be the point junctions between the grains if the ceramic was absent. It does not appear extensively between the side boundaries of the grains. The ceramic is apparently not a cementing matrix but is a sintering promoter.

The glass layer does not appear until after the FIG. 8 step. FIG. 17 shows how very effectively this layer protects the internal structure. Even though this layer may become very soft at the elements' maximum operating temperatures of 1800° it remains viscous enough not to be lost by gravity flow.

The iron included by the disilicide may further help the sintering action in the case of the rod extrusions. This iron remains distributed with an obviously very fine particle size during all of the steps.

The electrical resistances of these new elements increases relatively rapidly as the temperature increases from room temperature to their maximum operating temperatures. The 6 millimeter diameter heating part at 20° has a resistivity of about .014 ohm per meter of length which increases to about .124 ohm per meter of length at 1600°. When in service it is recommended that a starting voltage of one-third of the operating voltage be used. The lower voltage may be used for about 10 to 15 minutes after which the higher voltage may be applied. The voltage used in service depends on the temperature desired.

Normally the elements are sold while they still retain their temporary thermal plasticity. This permits the user to shape the elements somewhat as required to fit furnace fixtures or for other reasons. After the elements have been in service for some while this thermal plasticity period terminates. It is considered advisable not to use up this time period at the plant because of the convenience to the user it affords in some instances.

This commercial practice embodies principles generally concerned with the production of electrically conductive materials capable of practical use under oxidizing conditions at temperatures ranging above 1400° and up to the 1700° to 1800° range, particularly when in the form of an electric resistance heating element. These principles involve the general objective of sintering together particles of one or more silicides of the transition metals of the fourth, fifth and sixth groups of the periodic table, having melting temperatures higher than 1400°.

The following describes these fundamental principles and their relation to the described commercial practice.

When such silicides, including molybdenum disilicide, are subjected to sintering heat when in the form of a powder having a particle size no greater than 10 microns and under the necessary practically non-oxidizing atmosphere, the sintering action is promoted by the introduction of water vapor into this atmosphere. This water vapor should then not exceed about 0.5 percent by volume of said atmosphere. To a degree this apparently creates silica mixed with the otherwise unoxidized silicide in an utterly divided form. The result is then true sintering of the silicide particles directly to each other. It is not a silica ceramic bonding of the particles together unless too much silica is created. This silica does not exhibit destructive thermal expansion and contraction differences from that of the silicide when mixed with the silicide during the sintering or thereafter. Such silicides had previously resisted all such efforts to work them to a truly sintered mass of adequately low porosity to be of practical value, by using prior art powder metallurgy practices. The presence of the silica effectively reduces the porosity.

The above concept requires careful control of the time and amount of the water vapor introduction. However, prior to sintering it is possible to mix the silicide particles with a silica containing material providing a silica containing ceramic constituent in the silicide at least during its sintering, with the mixture of the silicide and silica containing material forming the starting material for the sintering being very finely divided as by grinding to an average particle size of from between 1 to 5 microns and at most 10 microns. This silica preferably remains in the product in the form of a ceramic but under certain conditions it may be entirely or partially removed by heating to incandescence in a protective atmosphere at high temperature. Molybdenum disilicide is the most suitable silicide for electric resistance heating elements, it should be reduced to a particle size of not greater than 10 microns, obviously requiring it to be maintained under non-oxidizing conditions, and by ordinary powder metallurgical techniques this very finely powdered molybdenum disilicide can be sintered into an electrically conductive mass of low porosity if silica is present between the particles at least during the later stages of the sintering operation and in an equally fine or finer divided state.

Silica in the form of a gel, such as silica hydrate, also known as silicic acid, may be mixed with the molybdenum disilicide particles having a size not greater than 10 microns, with enough water for workability. The resulting plastic may be pressed and sintered to obtain the desired electrically conductive sintered material of adequately low porosity to resist oxidation and to have adequate strength. The resulting material resists oxidation at temperatures ranging up to 1700° and 1800°. Inherently this material has the temporary thermal plasticity followed in time by the relatively rigid permanent condition. The silica in this case is of course colloidal in particle size and is proportioned so that it represents not more than about 5% of the finished molybdenum disilicide product. After the gel hardens the disilicide particles are protected against oxidation during the necessary handling to get the shapes into the inert gas sintering furnace.

Concerning proportions the amount of the silica containing ceramic must be from a small amount which is effective to promote the sintering of the silicide and reduce its porosity up to a maximum amount which physically separates the silicide particles so as to render the material electrically non-conductive. As little as one-half percent silica as related to the total silicide and ceramic mixture promotes the sintering to some extent. Plainly the minimum useful amount of ceramic depends on its silica content. Somewhere around a 70% content the ceramic material renders the silicide mixture electrically non-conductive. Proportions are difficult to state with exactness and it is best to stay reasonably well within such extremes.

Both prescribed requirements must be met for successful sintering. These are the 10 micron maximum silicide particle size limitation and the need for the presence of the equally or preferably more finely divided silica intermixed thoroughly with the silicide during the sintering. Without the silica in one form or another the 10 micron or smaller sized silicide particles will not sinter together effectively. The presence of the silica causes the fine silicide particles to cohere directly together with the silica then appearing as inclusions in a silicide matrix.

It is not objectionable and may be advantageous for the silica containing material to start out with a relatively low melting temperature which is below the sintering temperature used. When pure silica is used as the silica containing material with the silicide, neither during the sintering nor thereafter does it exhibit the crystalline phase changes at differing elevated temperatures which are characteristic of pure silica and which due to the relatively large volume changes would ordinarily be harmful to a material of the type here involved.

Molybdenum oxide and other compounds known to lower the surface tension or softening temperature of the silica may be used with the latter. Generally speaking this teaching may be variously stated but is to the effect that the sintered product has minimum porosity when the silica material is in a form having a low melting or softening temperature. Ceramists are familiar with the use of components adjusting the softening temperature of a silica containing ceramic. With the finely powdered molybdenum disilicide the softening temperature need not be adjusted to a value higher than the service temperature to be used. Even pure silica melts at a temperature below the 1800° maximum operating temperature described as practical for molybdenum disilicide and it presumably softens at lower temperatures when mixed in this silicide just as does the silica coating formed on its surface. The new concept results in a material which after a time period acts as if the ceramic has a high softening or melting temperature.

In the described commercial practice of the present application the "Wyoming" bentonite has a melting temperature of about 1200°, very considerably below that of the 1600° temperature or the 1800° maximum operating temperature of the electric resistance heating elements. In addition to providing the silica it has many advantages which have greatly contributed to the commercialization of the above concepts. Its inherent great swelling and shrinking characteristics are of advantage, its inherent plasticity and excellent dry bonding properties are advantageous and its extremely fine particle size, of course, provides the silica in an utterly divided or colloidal form. Further, this bentonite has the property of wetting the silicide particles quickly and thoroughly.

"Wyoming" bentonite is a clay of great swelling ability when mixed with water and comprising predominantly minerals of the montmorillonite type in particles of colloidal dimensions. With an appropriate amount of water it forms a gel.

An analysis of commercial "Wyoming" bentonite in percent is as follows:

$SiO_2$ ---------------------------------------- 63.20
$Al_2O_3$ --------------------------------------- 20.54
$Fe_2O_3$ ---------------------------------------- 3.51
$TiO_2$ ----------------------------------------- 0.15
$CaO$ ------------------------------------------ 1.30
$MgO$ ------------------------------------------ 2.49
$Na_2O$ ----------------------------------------- 2.16
$K_2O$ ------------------------------------------ 0.50
$SO_3$ ------------------------------------------ .53
$CO_2$ ------------------------------------------ .30
$H_2O$ (110 C.) --------------------------------- 7.19
$H_2O$ (90) ------------------------------------- 5.06

The above composition is subject to some variation and possibly is not complete but is generally representative of the commercial material used in the described commercial practice. It includes the necessary silica and the materials that remain in the final commercial elements comprise a thoroughly satisfactory ceramic constituent entrapped by a continuous network or matrix of molybdenum disilicide. It includes components which give it a relatively low melting temperature as compared to silica alone.

No good explanation can be offered as to why this new sintered material should at elevated temperatures, particularly the 1400 and 1500° or higher temperature ranges, be initially so plastic that if held horizontally it will sag by its own weight. This unique and very useful condition persists for various periods of time ranging safely around two hours but at times being detachable for longer times. Apparently the silica to a considerable extent is responsible for this particular phenomenon since it has been obtained to some degree by the use of pure silica alone. This characteristic disappears with the passage of time at the elevated temperatures. Thereafter the material has the physical characteristics to be expected theoretically from molybdenum disilicide when formed into a mass of the great density the silica makes possible, the physical properties being in fact enhanced at all temperatures by the presence of the ceramic phase to a degree dependent on the properties of this ceramic.

The new material appears under the microscope to comprise the directly interconnected particles of molybdenum disilicide forming the continuous matrix with the ceramic phase collected more or less at the corners of the particles and not being observable between the boundaries of their side portions. This is shown by FIG. 17 which is representative of the average or normal appearance of the new material.

In addition to its other advantages the use of bentonite in the commercial practice apparently has the effect of preventing undesired grain growth of the initially very small molybdenum disilicide particles. This desirable effect is obtained both during sintering and while the material is in service. There may be some initial increase in the grain size of the material during sintering but apparently further increase in grain growth is blocked in some fashion so that insofar as is now known the electric resistance elements may remain at 1600° and probably even at 1800° under oxidizing conditions without any time limit to their serviceability.

In the commercial practice the 5% quantity of the bentonite gives optimum properties concerning both the processing and the ultimate product. The balance is all molybdenum disilicide. Something like 60% to 70% of the bentonite renders this product an electrically non-conductive ceramic containing disilicide particles separated by the ceramic. As little as 1% bentonite gives about the .50% silica providing at least an appreciable sintering promoting effect and 2%, giving a little over 1% silica, is a better safe minimum. Such very small amounts of ceramic may not be determinable by analyzation of the final product. The electrical conductivity decreases with increasing amounts of the bentonite. This conductivity may be adjusted by the inclusion of more highly conductive particles of either metal or other silicides or hard metals intermixed with the mixture prior to sintering. Such an expedient might be used for the terminals to provide even cooler ends than their double diameter provides.

The aluminum sprayed on the terminal ends could be copper, silver or the like. Any softly malleable and electrically conductive metal can be used providing it can be applied without harmfully affecting the molybdenum disilicide.

In the case of electric resistance heating elements in particular molybdenum disilicide should be used as the main electrically conductive component. The ceramic may contain the silica in solid solution with other ceramic materials, such as alumina, be in chemical combination therewith or mixed therewith as fine silica. This does not exclude very small amounts of other components.

In the commercial practice thermal cracking is not a serious problem. Generally speaking the use with molybdenum disilicide of the bentonite of the "Wyoming" or the swelling type of clay predominantly consisting of colloidal sized particles of minerals of the montmorillonite type, when used in the proportions ranging around 5%, has overcome this problem. This clay has been responsible for converting the basic principles into the practical commercial process described initially above.

Apparently the sintering promoting silica should be present as free silica intermixed with the finely powdered silicides during the sintering under the non-oxidizing conditions. If initially in some other form in the silica containing material the silica should be capable of converting to free silica during the sintering. Such free silica if initially pure silica necessarily becomes a silica glass during the sintering operation. In some instances this may be due to picking up ions of the metal of the silicide, particularly when the silicide is molybdenum disilicide. However, practically all silica containing ceramic materials also contain substances which initially or during fusion convert the silica to a glass form which is permanently vitreous. The melting temperature and surface tension of such silica glass may be lowered by including substances well known in ceramics to have these effects on silica glass. As previously indicated the silica is more effective when in a form which can substantially soften or melt during the sintering so as to wet the silicide particles and thus act most quickly. After the ultimate material is produced with high temperature and time it becomes resistant to deformation at high temperatures above the softening or melting temperature of the silica glass regardless of the latter's characteristics initially.

The general rule is that with the silicides of the 10 micron or less particle size and using equally or preferably more finely divided silica, a very little silica such as about 1% promotes sintering, about 4% or more is better since it retards grain growth at elevated temperatures, porosity is reduced and sintering is further facilitated if the silica is modified by any of the well known substances for reducing its melting temperature and surface tension, and too much silica, about 70%, produces a non-conductive material.

In the preparation of the sintered body, the molybdenum disilicide is in a finely divided form, having an average particle size of not more than about 10 microns, and usualy about 0.05 to about 10 microns. Such a material, when sintered alone at an elevated temperature, undergoes interfusion of particles to provide a firm body which is capable of many uses, more important of which is its use as a heat resistant element. However, as previously indicated, at high temperatures of usage the sintered body undergoes grain growth, recrystallization and creep, causing the life of the material to be shortened. It is proposed to overcome these disadvantages at elevated temperatures by using a swelled clay with the molybdenum disilicide and the method of accomplishing this purpose will be desecribed in greater detail hereinbelow.

The ceramic material employed for the purpose of this invention is a swelled or plasticized clay. Under the conditions of manufacture, the clay in some unknown manner improves markedly the ability of molybdenum disilicide to resist grain growth, recrystallization and creep. It is found that dry clays work on improvement, in such properties, but quite unexpectedly it was found that the use of swelled clays is much better. The clays which perform especially well for this purpose are of the montmorillonite group, for example, beidellite, saponite, etc. The bentonite clays are best suited for this purpose. The clay can be plasticized or swelled by the addition thereto of water or any polar liquid, i.e. a liquid which has a high dielectric constant. Without being bound by my theory, it is believed that the water penetrates between the leaves of crystals in the clay and serves as a lubricating layer which facilitates transposition or movement of the crystal leaves relative to each other and thereby makes it possible to obtain good distribution of the clay through the sintered body. The clay is plasticized, for example, by the addition of water or any other suitable liquid. In preparing the sintered body about 0.2 to about 20% by weight of clay is employed based on the total composition. The quantity of clay is varied in accordance with the grain size of the metal-like material. The smaller the grain size, the greater amount of clay to be used in preparation of the sintered body.

After the molybdenum disilicide and swelled clay are admixed, the mixture is treated by first sintering in a non-oxidizing atmosphere at a temperature of about 1000° to 1400° C. and then sintering in an oxidizing atmosphere at a temperature of 1400° to 1700° C. The material can be extruded into whatever shape is desired. The important factor in the sintering process is that the ultimate temperature must be sufficient to melt the ceramic material and cause sintering of the molybdenum disilicide. In a molten state, the ceramic material diffuses throughout the material being sintered, so that the finished sintered body is capable of resisting grain growth, recrystallization, creep and oxidation in accordance with the objects of this invention. Since the ceramic material must be melted, the ultimate temperature of sintering will vary in accordance with the type of ceramic material being used. In general, however, the temperature in the final sintering in oxidizing atmosphere will be about 1400° to about 1700° C. The initial non-oxidizing sintering treatment at a temperature of 1000° C. to 1400° C. serves to impart rigidity to the body and thus facilitate handling.

The first sintering step involves heating at an elevated temperature in the absence of oxygen. Consequently, the atmosphere surrounding the body being sintered is a reducing or inert atmosphere or one in which there is a substantial absence of any gaseous material. This is accomplished by sintering in a vacuum or sintering in the presence of hydrogen which forms a reducing atmosphere or an inert gas, such as argon. After sintering in the absence of oxygen, the material preliminary sintered must be further sintered in the presence of oxygen. The metal-like material is capable of being oxidized at elevated temperatures. The product of oxidation is silica. The oxidation product is formed on the grain surfaces of the sintered body. In the present invention the clay combines with the oxidation product to form a ceramic layer which makes the sintered body even more resistant to grain growth, recrystallization and creep than a sintered body which is substantially free of the oxidation product. The temperature for sintering in the presence of oxygen should be at least at the melting point of the clay material being employed.

Heating in the prsesence of oxygen is done for a period of about 1 to about 10 minutes. The purpose of the second sintering step is to allow the porosity of the sintering body to be filled with the oxidation product, silica, and thence combine with the clay. Such a product has exceptional properties from the standpoint of strength, resistance to grain growth, oxidation, recrystallization, creep, etc.

In order to provide a fuller understanding of this invention, reference will be had to the following specific example.

Example

Raw materials for the manufacture of $MoSi_2$-powder are commercial molybdenum powder and commercial technical silicon. The silicon is crushed and leached with acids to give a powder with 0.5% Fe. Molybdenum and silicon are mixed corresponding to $Mo+2Si$, packed in a heat resistant box with a lining of $MoSi_2$-scrap and heated under pure hydrogen to reaction. The silicide sponge formed is jawcrushed and ground in a hard metal ballmill in pure gasolene for 120 hours. The silicide powder formed is dried under vacuum and has a grain size finer than 10 microns.

100 parts of molybdenum disilicide powder having grain sizes finer than 10 microns are moved with bentonite (Wyoming) corresponding to 5 parts of silica, and water added to suitable workability. The plastic mixture is worked 48 hours under vacuum and extruded. The extruded rods, 7 and 14 mm. respectively, are dried and presintered under pure hydrogen up to 1000° C. The rods are then pushed through a furnace under pure hydrogen at 1300–1400° C. and after that treatment they have strength enough to be handled. The porosity is now about 15 to 20% by volume and the composition corresponds to the raw materials used.

The rods are now sintered a few minutes in air at 1600° C. by means of direct current heating. Because of the bentonite addition the material can be formed by hand at 1600° C. into any desired shape. The heating in air gives a product with 0–5% porosity and a fair strength. The material is, however, oxidized to an extent, which corresponds to the formation of about 6% by weight $SiO_2$, which is formed from the silicide. The sintered product therefore contains 2 different phases: $MoSi_2$ and glass. After a few hours at 1600° C. some reaction takes place. The practical result in this reaction is that the material cannot be formed any more and thus retains its shape.

Based on the above description, it becomes apparent that we can obtain an excellent heat resistant element by mixing molybdenum disilicide which is finely ground to about 5 micron size with about 5% by weight of swelled bentonite clay and sintering the mixture at 1600° C. Such a heat resistant element has exceptional resistance to heat, oxidation, creep, grain growth and recrystallization. The mechanical strength of the sintered body produced from molybdenum disilicide and swelled clay is approximately twice that of molybednum disilicide alone. Depending on the amount of clay employed and the grain size of the sintered body, the ultimate bending strength is improved from a value of 20 kg., per sq. mm. for molybdenum disilicide alone to a value of about 40 to 60 kg. per sq. mm. for the sintered body of molybdenum disilicide which has been prepared with swelled clay.

Based on the quantity of swelled clay which is used in the manufacture of the sintered body, it is apparent that even a small percentage of swelled clay imparts to the powdered silicide the necessary plasticity which permits the material to be shaped in accordance with techniques conventionally applied in the art of ceramics.

Another advantage in the use of swelled clay for the manufacture of sintered bodies of molybdenum disilicide is that the clay in a dried state imparts sufficient strength to the powdered mixture to facilitate handling in the process of making large sintered bodies. By having the clay in a plasticized state, it becomes distributed uniformly throughout the powdered mass so that upon drying it serves to bind the material sufficiently to permit handling without disintegration.

Another important aspect of the present invention is that the swelled clay is heated to its melting point which is below that of molybdenum disilicide. At the final temperature of treatment the molybdenum disilicide is sintered while the clay is present as a liquid phase in the body being treated. By having the clay present in this physical state the sintering of molybdenum disilicide is promoted and, therefore, the sintered body possesses exceptional mechanical properties as compared to a sintered body which has been made without the use of a swelled clay. At operating temperature sodium will, at least partly, volatilize and, as the case may be, oxides will be reduced which all will tend to raise the melting point of the ceramic glass.

What I claim is:

1. A process consisting essentially of admixing finely divided molybdenum disilicide with about 0.2 to 20% of a finely divided plastic clay of the montmorillonite group, sintering the mixture in a non-oxidizing atmosphere at about 1000 to 1400° C., thereby producing a presintered porous material, and then heating the presintered material in an atmosphere having free access of oxygen at a temperature of 1400 to 1700° C. at which the clay is melted and thereby facilitating the sintering together and interbonding of the silicide grains and enhancing the resistance of the sintered body to oxidation, grain growth, creep and recrystallization.

2. A process as claimed in claim 1, in which said clay is bentonite.

3. A process as claimed in claim 1, in which water is added to cause said clay to swell before it is intermixed with said molybdenum disilicide.

4. A process as claimed in claim 1, in which a plastic mass is formed from the disilicide powder and the plastic clay, said mass being extruded to form rods and said rods being sintered to produce electric resistance elements.

5. A process as claimed in claim 1, in which the average grain size of molybdenum disilicide is less than 10 microns.

6. A process as claimed in claim 1, in which a polar liquid is added to said clay, said liquid having swelling properties with respect to the clay.

7. A process as claimed in claim 1, in which the sintering step in an atmosphere having free access of oxygen has a duration of from 1 to 10 minutes.

8. A process as claimed in claim 1, in which the presintering step is carried out to an extent such that the porosity of the presintered materials is 15 to 20% by volume.

9. A process as claimed in claim 1, in which heating in an atmosphere having free access of oxygen is carried out to an extent such that the porosity of the sintered body is reduced to 0 to 5%.

10. A shaped body prepared from heat-resistant oxidation-proof material consisting mainly of molybdenum disilicide, said body being composed of finely divided particles of molybdenum disilicide forming a solid continuous matrix having extensive intergrain portions bonded directly together without any visible interposed constituent, finely divided particles of a ceramic phase disposed between the particles of molybdenum disilicide and substantially filling the pores of said body, there being no observable ceramic layers between the interparticle boundaries of the molybdenum disilicide grains, said ceramic being formed by fusion of a plastic clay of the montmorillonite group, the amount of said clay being 0.2 to 20% based on the weight of molybdenum disilicide.

11. The product as described in claim 10, in which the clay is bentonite.

12. The product as described in claim 11, in which the added quantity of bentonite corresponds to 5 parts $SiO_2$ for 100 parts $MoSi_2$.

13. The product described in claim 10 in the form of a rod sintered to produce an electric resistance heating element.

14. The product as described in claim 10, in which the average grain size of the molybdenum disilicide is less than 10 microns.

15. The product as described in claim 10, in which the porosity of the sintered body is in the range of 0 to 5%.

16. A shaped body prepared from heat-resistant oxidation-proof material consisting mainly of molybdenum disilicide, said body being composed of finely divided particles of molybdenum disilicide forming a solid continuous matrix having extensive intergrain portions bonded directly together without any visible interposed constituent, finely divided particles of a ceramic phase disposed between the particles of molybdenum disilicide, there being no observable ceramic layers between the interparticle boundaries of the molybdenum disilicide grains, said ceramic being formed by fusion of a plastic clay of the montmorillonite group, the amount of said clay being 0.2 to 20% based on the weight of molybdenum disilicide.

17. A shaped body prepared from heat-resistant oxidation-proof material consisting mainly of molybdenum disilicide, said body being composed of finely divided particles of molybdenum disilicide forming a solid continuous matrix having extensive intergrain portions bonded directly together without any visible interposed constituent, finely divided particles of a ceramic phase disposed between the particles of molybdenum disilicide, there being no observable ceramic layers between the interparticle boundaries of the molybdenum disilicide grains, said ceramic being formed by fusion of a plastic clay of the montmorillonite group and by oxidation of the disilicide particles, the amount of said clay being 0.2 to 20% based on the weight of molybdenum disilicide.

References Cited in the file of this patent

UNITED STATES PATENTS

| | | |
|---|---|---|
| 1,787,749 | Heyroth | Jan. 6, 1931 |
| 1,989,736 | Boyles | Feb. 5, 1935 |
| 2,622,304 | Coffer | Dec. 23, 1952 |
| 2,652,338 | Greger | Sept. 15, 1953 |
| 2,747,260 | Carlton et al. | May 29, 1956 |

UNITED STATES PATENT OFFICE
CERTIFICATE OF CORRECTION

Patent No. 3,027,331            March 27, 1962

Nils Gustav Schrewelius

It is hereby certified that error appears in the above numbered patent requiring correction and that the said Letters Patent should read as corrected below.

Column 4, line 3, after "use" insert -- of --; column 7, line 35, for "desification" read -- densification --; column 8, line 10, after "parts" insert -- both --; line 25, after "shroud" insert -- 45 --; same column 8, line 39, for "element" read -- elements --; column 15, line 14, for "moved" read -- mixed --; column 16, line 56, after "be" insert a hyphen.

Signed and sealed this 10th day of July 1962.

SEAL)
Attest:

ERNEST W. SWIDER           DAVID L. LADD
Attesting Officer           Commissioner of Patents